L. ST. C. BRACH.
NUT LOCK.
APPLICATION FILED APR. 20, 1909.
1,062,581.
Patented May 27, 1913.
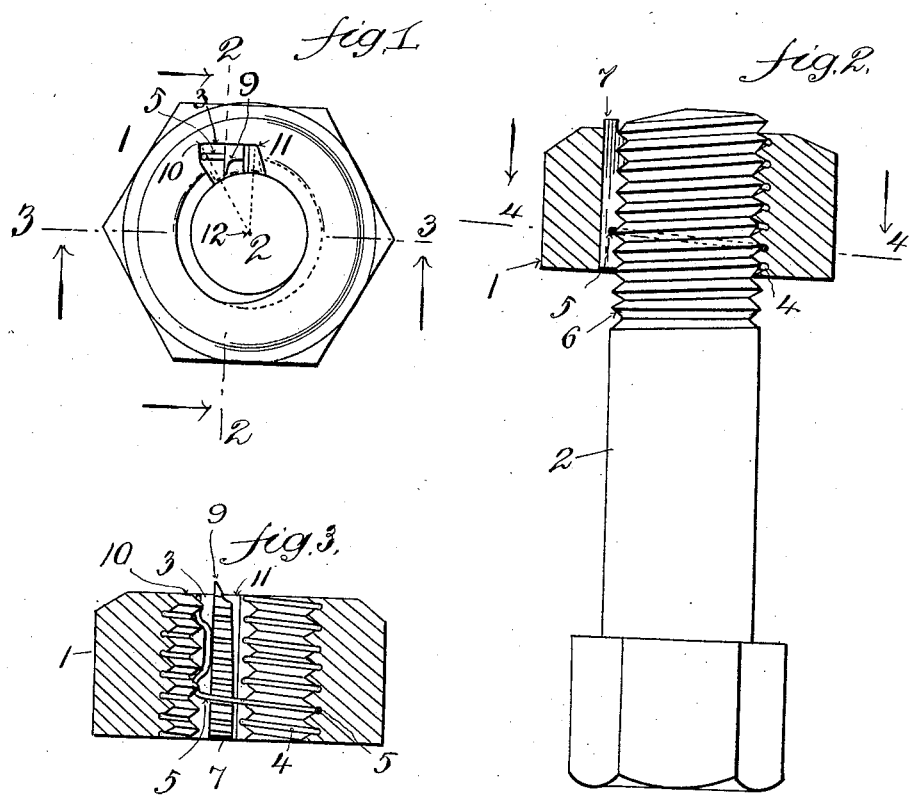
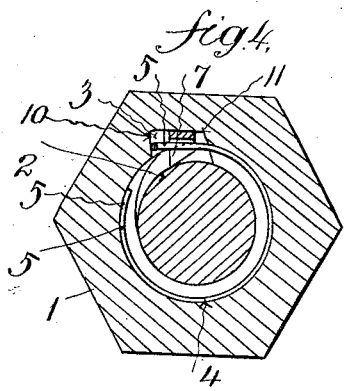
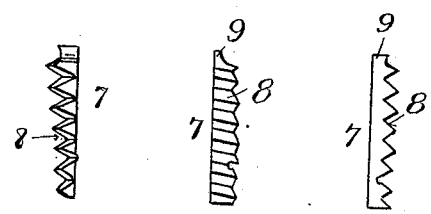
Witnesses:
Inventor
Leon St. Clair Brach.
By his Attorney

UNITED STATES PATENT OFFICE.

LEON ST. CLAIR BRACH, OF NEW YORK, N. Y.

NUT-LOCK.

1,062,581. Specification of Letters Patent. Patented May 27, 1913.

Application filed April 20, 1909. Serial No. 491,046.

*To all whom it may concern:*

Be it known that I, LEON ST. CLAIR BRACH, a citizen of the United States, and a resident of the city, county, and State of New York, have invented a new and useful Improvement in Nut-Locks, of which the following is a specification.

The object of my invention is to provide a device of this class which will securely hold a nut in place on a bolt regardless of the conditions incident to the use to which the bolt is put so that under no conditions of service can the nut be removed from the bolt except by the use of an instrument when it is intended that the nut shall be removed.

A further object is to provide a suitable means to prevent the component parts of the nut lock from getting lost or separated when not in use.

These and other objects are accomplished by my invention, one embodiment of which is hereinafter set forth.

For a more particular description of my invention, reference is to be had to the accompanying drawings forming a part hereof in which, Figure 1 is a plan view of my improvement. Figs. 2 and 3 are sectional views taken on the lines 2—2 and 3—3 of Fig. 1, respectively, looking in the direction of the arrows. Fig. 4 is a sectional view taken on the line 4—4 of Fig. 2, looking in the direction of the arrows. Figs. 5, 6 and 7 are a side and front elevation and a second side elevation respectively, of the locking member.

Throughout the various views of the drawings similar reference characters designate similar parts.

My improved nut 1 is applied to a bolt 2 in the conventional manner. In the nut 1 is a longitudinal slot 3 running the length thereof and transversely of the threads. The gorges 4 of the nut are provided with a groove which is sufficiently large to receive and hold a spring wire 5 clear of the threads 6 of the bolt 2.

In the slot 3 is placed a detent 7 which has threads 8 corresponding with the threads of the nut and bolt and this detent 7 is so arranged and disposed as to rest in the slot 3 in such a manner as to permit its engagement with the threads 6 when the nut is screwed on the bolt. One end is provided with a tang 9 which shows where an instrument should be used when the nut is to be removed. The detent 7 is made narrower near the tang 9 than at the other end so that when the said instrument is inserted, it will act properly in displacing the detent 7 against the action of the spring 5.

The spring 5 has one portion bent in a helical line to fit the groove in the gorge 4 of the nut 1 and its remaining portion is curved as shown in Fig. 3, so as to press against the detent 7 and hold this detent against the wall of groove 3 as shown in Fig. 3. This spring wire 5 rests in a gorge of the detent 7 the same as in the gorge 4 of the nut. The detent 7 is preferably made of steel that is harder than the metal of the bolt 2 so that it will bite the threads 6, but this may be as desired.

The nut is inserted on the bolt in the conventional manner. When it is withdrawn a wire or similar instrument is shoved down the slot 3 on the side of the detent removed from the spring 5 and this spring is somewhat compressed. With the instrument thus held in place the nut is removed in the conventional manner. The spring wire 5 serves two purposes. In the first place it prevents the detent 7 from getting loose from the nut 1 before the nut is applied to a bolt so that this detent and the nut may be packed as usual without any danger of any nut losing its detent and with the assurance that each nut will be ready for use whenever desired. Second, when the nut is applied to a bolt in the conventional manner, the spring 5 causes the detent 7 to promptly engage the threads 6 whereby the nut 1 is fixed on the bolt 2 against all further turning due to vibrations, pressure or otherwise.

It is to be noted that the corner of the slot 3 designated 10 is farther from the axis 12 of the nut 1 and bolt 2 than the corner 11, and these corners 10 and 11 are connected by a substantially flat surface or bottom against which the key 7 rubs. Any attempt to take the nut 1 off the bolt 2, except as above described, will cause the key 7 to move bodily and jam or wedge in the slot 3 and fixedly hold the nut against removal.

While I have shown and described one embodiment of my invention, it is obvious that it is not restricted thereto, but may be embodied in various forms which are covered in the annexed claims.

What I claim is:

1. In a device of the class described, a nut, a longitudinally disposed slot in said nut, a detent in said slot, having threads corresponding with the threads of the nut, and a wire engaging in the gorges of the threads of said nut and extending into the gorges of the threads of said detent, whereby to hold the detent in place.

2. In a device of the class described, a nut having grooves in gorges of the threads, a longitudinal slot in said nut, a detent in said slot having threads corresponding to the threads of the nut, and a wire resting in the grooves in said gorges and holding said detent in place.

3. In a device of the class described, a nut having threads therein, a longitudinal slot intersecting said threads, a detent having threads corresponding to the threads of the nut and a spring wire having a portion bent into ring shape, and fitted in the gorges of the threads of said nut and having another portion bent to fit between said detent and the walls of said slot whereby said detent is properly held in said nut.

4. In a device of the kind described, a bolt, a nut thereon, a locking member between the nut and bolt, and spring means between the nut and bolt having a portion engaging the locking member to prevent movement thereof in one plane and having another portion engaging the locking member and urging the same to movement in a plane transverse to said first named plane.

5. In a device of the kind described, a nut provided with a slot having a bottom with one end closer to the axis of the nut than the other, a locking member bodily movable along the bottom of the slot and provided with threads corresponding to those of the nut, and a member having a portion engaging the threads of the nut and of the locking member, and having a spring portion engaging the locking member and urging it to movement within the slot.

6. In a device of the class described, a nut provided with a slot, a locking member movable in the slot, and a member having a portion engaging the nut in such manner as to retain the member in the nut, said member extending into engagement with one part of the locking member so as to hold the locking member against displacement, and said member also having a spring portion engaging another part of the locking member, for the purpose set forth.

In witness whereof, I have signed my name to this specification in the presence of two subscribing witnesses.

LEON ST. CLAIR BRACH. [L. S.]

In the presence of—
BENEDICT S. WISE,
BENJAMIN H. STERN.

---

Copies of this patent may be obtained for five cents each, by addressing the "Commissioner of Patents, Washington, D. C."